INVENTOR.
KENNETH M. GAVER
ESTHER P. LASURE
LEVI M. THOMAS
BY Dawn H. & Schmeding
THEIR ATTORNEY Reissued July 29, 1952

Re. 23,528

UNITED STATES PATENT OFFICE 23,528

REACTION OF GLUCOPYRANOSE POLYMERS WITH SUBSTITUTED AMMONIUM HYDROXIDES

Kenneth M. Gaver and Esther P. Lasure, Grove City, and Levi M. Thomas, Columbus, Ohio, assignors to The Keever Starch Company, Columbus, Ohio, a corporation of Ohio Original No. 2,563,526, dated August 7, 1951, Serial No. 765,370, August 1, 1947. Application for reissue March 22, 1952, Serial No. 277,936

12 Claims. (Cl. 260—233.3)

Figure 1:
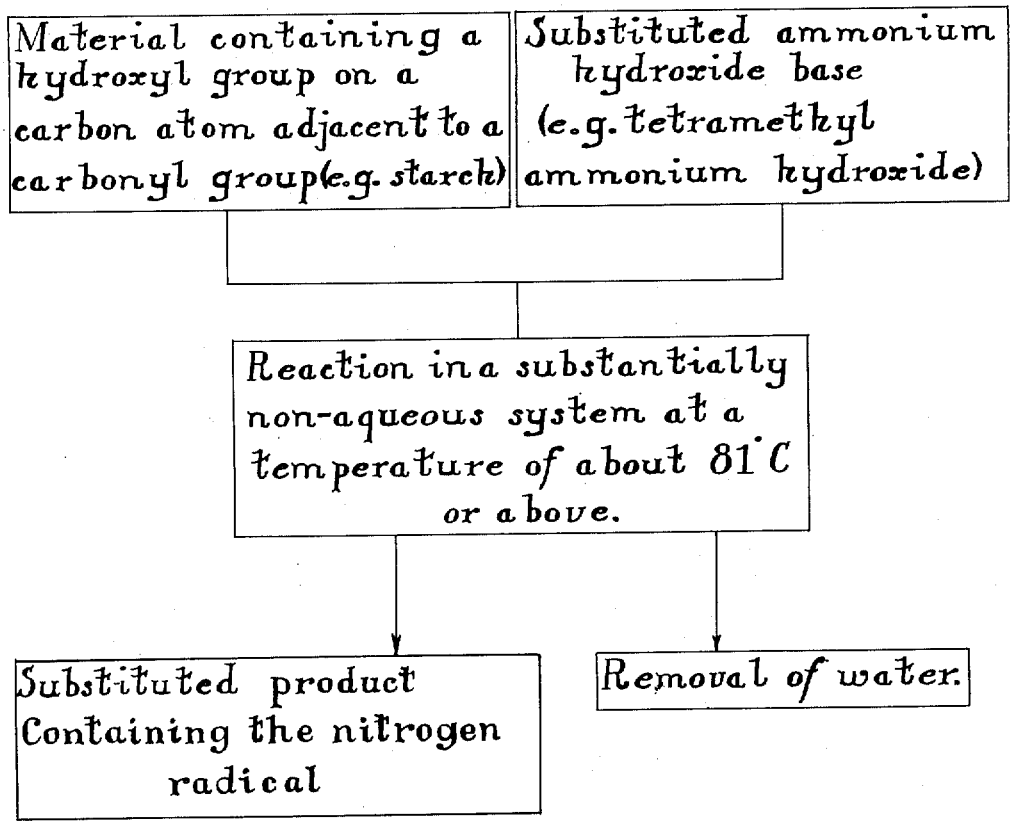

This application is an application for reissue of Patent No. 2,563,526, granted on August 7, 1951.

The inventions disclosed in this application relate to new compositions of matter and to new processes for the formation of such new compositions of matter. The new compositions of matter invented by us result from the chemical reactions of primary, secondary, tertiary or quaternary substituted ammonium hydroxides with carbohydrates and similar material. Examples of the substituted ammonium hydroxides are:

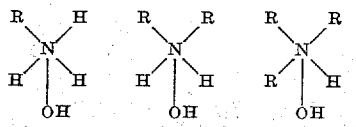

and

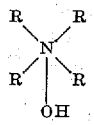

(where each R may be any monovalent organic radical). The carbohydrate may be any aldehyde or ketone derivative of a polyhydric alcohol. The formula for such a carbohydrate is $$n[(HCOH)_x]-(n-1)[H_2O]$$

where $x$ equals the number of carbon atoms per unit and $n$ equals the number of units per molecule. Materials similar to carbohydrates which may be reacted similarly with the substituted ammonium hydroxides are carbohydrate containing materials and similar materials containing a hydroxyl group on a carbon atom adjacent to a carbonyl or potentially carbonyl group. When such substituted ammonium hydroxides are reacted with the carbohydrate or similar material under proper conditions later to be described herein, the hydroxyl of the hydroxide forms water with hydrogen of the most acidic of the carbohydrate (or similar material) hydroxyls and the remainder of substituted ammonium hydroxide is substituted so as to form a carbohydrate having a formula of $$n[(HCOH)_{x-1}(HCONRG_3)]-(n-1)[H_2O]$$

where each G is either a hydrogen atom or any monovalent organic radical and where R may be any monovalent organic radical. The processes described herein illustrating our inventions are especially designed to produce such new products from carbohydrates.

The new compositions of matter produced from the reactions of quaternary bases with starches are good examples thereof. In the production of such new compositions of matter from the reaction of quaternary bases with starch, the new process comprises ordinarily a step of reacting starch with a quaternary base so as to produce a compound composed of an undetermined number of polymerized glucopyranose units all or most of which units will each have a general structural formula substantially as follows:

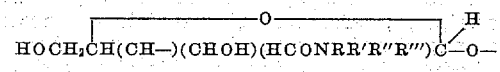

where R, R′, R″ and R‴ may be the same or different monovalent organic radicals. To designate compounds conforming to the above formula we use the terms "quaternary starchates" which we define as follows: "Quaternary starchate" means and is used in this specification and in the claims hereof in the sense of the compound composed of an undetermined number of polymerized glucopyranose units wherein a quinquevalent nitrogen having four substituent organic radicals attached thereto is substituted for one of the hydrogen atoms of one of the several hydroxyl groups of the starch unit so as to form a polymerized compound which in fact is (or is at least analogous to) an alcoholate or ether of starch.

As used in this specification and claims we define "carbohydrate" to mean "any aldehyde or ketone derivative of a polyhydric alcohol" and "starchate" to mean "any compound composed of an undetermined number of polymerized glucopyranose units wherein one or more metallic or nonmetallic atoms or organic or inorganic radicals are substituted for one or more of the hydrogen atoms of the several hydroxyl groups of the starch unit to form a polymerized compound which in fact is (or at least is analogous to) an alcoholate or ether of starch."

Prior to our inventions as disclosed herein a certain process has been discovered for the substitution of alkaline metals in the starch molecule which we will refer to hereinafter as the "ammonia process starchate." As demonstrated in copending application Serial No. 694,328 of Kenneth M. Gaver, Esther P. Lasure and Derk V. Tieszen and in Patent No. 2,518,135 issued to Kenneth M. Gaver on August 8, 1950, and as demonstrated hereafter in this application such prior art processes produce starchates which differ essentially from the starchates disclosed in this application as being formed by our improved process. In copending application Serial No. 747,108, we have disclosed certain amidogen starchates and processes for their synthesis. Also in said copending application Serial No. 694,328 and in said Patent 2,518,135 there is disclosed the formation of a monosodium starchate, other monoalkali starchates and monometallic, mononon metallic and monoorganic derivatives thereof but as was demonstrated in said copending applications and as will be demonstrated hereafter herein, such starchates also differ from the amidogen starchates and from the quaternary base starchates described herein.

One of the objects of our invention is the provision of new and useful products from carbohydrates and similar materials.

A further object of our invention is the provision of new processes of forming such new and useful products.

A further object of our invention is the provision of new and useful products formed from starch.

A further object of this invention is the provision of tetra-substituted ammonium hydroxide starchates and of new methods of synthesizing such compounds.

A further object of our invention is the provision of new and useful processes for forming various new products from starch.

Further objects and advantages of the present invention will be apparent from the following description, reference being had to the accompanying drawings wherein a preferred form of embodiment of the invention is clearly shown.

In the drawings:

Fig. 1 illustrates methods of synthesizing the desired products.

In said copending applications Serial No. 694,328 and No. 707,318, now Patent No. 2,518,135, there are disclosed inventions relating to monometallic starchates (both alkali and nonalkali) to mononon metallic starchates, to monoorganic starchates, and to hydrolysis products of such starchates and to methods for their preparation. We have discovered that where a carbohydrate (or similar material) is reacted in a nonaqueous system with a primary, secondary, tertiary or quaternary ammonium hydroxide as illustrated above, at a temperature of from 80–81° C., a reaction occurs in which water is evolved and the carbohydrate (or similar material) is condensed with the substituted ammonium hydroxide to form a substituted ammonium carbohydrate product. Specifically, for example, where starch is reacted in a nonaqueous solvent with quaternary base, at a temperature of from 80–81° C., a reaction occurs and water is evolved (comprising the hydrogen of the number two hydroxyl from the glucopyranose unit of the starch and the hydroxyl of the quaternary base) to form the substituted ammonium starchate.

TYPE OF CARBOHYDRATE USABLE

Any type of carbohydrate is usable as is any other compound having a hydroxyl group on the carbon adjacent to a carbonyl or potentially carbonyl group. Similar reaction products have been prepared using waxy rice, yucca, sago, arrowroot, sweet potato, potato, corn, wheat, tapioca and amioca starches; various thin boiling starches; potato, tapioca and corn dextrins; dextran; sugars such as sucrose; glucosides such as α-methyl glucoside; cellulose such as cotton, linen, jute and ramie; inulin; and gums such as locust bean gum, tragacanth and gum arabic.

SOLVENTS

Any nonaqueous system is suitable. If a solvent is used it preferably should be substantially nonaqueous. Any of the higher boiling alcohols may be used as solvents although we prefer toluene and consider butanol as very useful. Ketones, ethers and other hydrocarbon solvents may be used. In some cases no solvent need be used at all. For example, starch and a quaternary base will react dry.

TEMPERATURE

A temperature of 80–81° C. appears to be critical. Using temperatures up to 115° C. with or without the removal of the water, we have found no evidence indicating the formation of any derivative other than mono.

PRESSURE

We observed no particular benefits or detriments derived from pressure reaction.

TIME

The time factor undoubtedly has considerable influence on the reaction. However, prolonged reaction periods do not seem to produce better reactions than short vigorous reactions. No logical study has been given to this variable.

REMOVAL OF WATER

Preferably the water formed by the reaction should be removed substantially as formed as also should most of any other water present in the system (as for example water contained in the carbohydrate or in the solvent).

One of the most practical methods of removing water is by distillation. For example, water forms an azeotrope with many of the useful solvents enabling us to distil the water originally present in the system and the water formed by the reaction with a portion of the solvent while retaining in the system the main body of the solvent inasmuch as the azeotrope boils below the boiling point of the solvent as well as below the boiling point of water.

The process of removing water from the reacting ssytems is disclosed and claimed in our copending application Serial No. 24,628 filed May 1, 1948.

CHARACTER OF AMMONIUM HYDROXIDE

Where a quaternary base is mixed with the carbohydrate at a temperature of 80–81° C., little difficulty is experienced with the reaction. Where a tertiary base is used, greater difficulty is experienced and the difficulty in inducing the reaction is increased as the ionization constant is reduced when using the secondary and primary bases. It was found that an ionization constant of $2\times10^{-5}$ was very desirable in reactions involving alkali hydroxides such as sodium hydroxide with starch. However, with the quaternary bases an ionization constant as low as $10^{-5}$ is very satisfactory. Moreover, primary, secondary and tertiary bases with even lower ionization constants can be made to react under strongly dehydrating conditions which induce the removal of the water as formed, as, for example, by distillation or by the use of dehydrating agents. We have been unable to cause either ammonia or unsubstituted ammonium hydroxide to react.

PROPERTIES OF THE PRODUCTS

The products formed hydrolyze immediately but not completely in water. They are decomposed by acids. They are subject to replacement of the $N(R_4)$ group by metals when reacted with metallic halides as is shown in the following Equation 1. They are subject to replacement of the $N(R_4)$ group by nonmetals when reacted with nonmetallic halides as is shown in the following Equation 2. The $N(R_4)$ group also may be replaced by organic groups according to Equation 3 following:

(1) $C_6H_9O_5N(R_4)+MX^a \rightarrow C_6H_9O_5MX_{(a-1)}+R_4NX$
(2) $C_6H_9O_5N(R_4)+DX^a \rightarrow C_6H_9O_5DX_{(a-1)}+R_4NX$
(3) $C_6H_9O_5N(R_4)+RX \rightarrow C_6H_9O_5R+R_4NX$ (where $a$ equals one or more; M equals any metal; D an inorganic nonmetal; R an organic group; and X is a halogen or similarly reacting group such as, for example, a nitrate, etc.).

MECHANISM OF THE REACTION

The mechanism of the reaction proceeds along lines similar to those illustrated by the following equations:

(1) Addition $C_6H_{10}O_5+R_4NOH \rightarrow C_6H_{10}O_5 \cdot HONR_4$
(2) Dehydration
$C_6H_{10}O_5 \cdot HONR_4 \rightarrow C_6H_9O_5NR_4+H_2O$

EXAMPLES

*Example I*

50 grams of corn starch
60 grams of benzyl trimethyl ammonium hydroxide
500 ml. of toluene Heat with agitation and slow distillation until 250 ml. of distillate have been collected. Filter on suction, wash with toluene and then with ether and then air dry. Water is evolved in this reaction. Air dry weight of product 82 grams (calculated 89 grams). This weight yield approximates that obtained in the sodium starchate reaction. Distillate is neutral.

*Example II*

200 grams wheat dextrin
91 grams anhydrous tetramethyl ammonium hydroxide
900 ml. normal butanol Heat with vigorous agitation for two hours at a temperature of 92–95° C. whereby the moisture originally present in the dextrin and the water liberated during the reaction is removed as the butanol azeotrope (B. P. 92° C.). At the end of the reaction period the reaction product is filtered on suction, washed with butanol, then with ether and air dried. Air dry weight 270 grams. The product is a pale buff free flowing powder.

*Example III*

200 grams locust bean gum
103 grams neurine (trimethylvinyl ammonium hydroxide)
2000 ml. benzene This mixture was heated with vigorous agitation at boiling temperatures with distillation until 1000 ml. of distillate was collected. The moisture originally present and that liberated in the reaction was removed from the reaction mixture as the benzene azeotrope. At the end of the reaction period the reaction product is filtered on suction, washed with benzene then with ether and air dried. Air dry weight 282 grams. The product is a pale buff free-flowing powder.

It is to be understood that the above described embodiments of our invention are for the purpose of illustration only and various changes may be made therein without departing from the spirit and scope of the invention.

We claim:

1. A process of forming uniformly substituted nitrogen containing glucopyranose polymers which comprises mixing glucopyranose polymers with a substituted ammonium hydroxide at a temperature in the range of 80° C. to 115° C. in a substantially nonaqueous system with provision for substantial removal of water formed by the reaction.

2. A process of forming uniformly substituted nitrogen containing glucopyranose polymers which comprises mixing glucopyranose polymers with a tetra substituted ammonium hydroxide in the range of from 80° C. to 115° C. in a substantially nonaqueous system.

3. A process of forming a uniformly substituted nitrogen containing starchate which comprises the process of heating a mono substituted ammonium hydroxide with starch at a temperature of from 80° C. to 115° C. in a substantially nonaqueous system with provision for substantial removal of water formed by the reaction.

4. A process of forming a uniformly substituted nitrogen containing starchate which comprises the process of heating a di-substituted ammonium hydroxide with starch at a temperature of from 80° C. to 115° C. in a substantially nonaqueous system with provision for substantial removal of water formed by the reaction.

5. A process of forming a uniformly substituted nitrogen containing starchate which comprises the process of heating a tri-substituted ammonium hydroxide with starch at a temperature of from 80° C. to 115° C. in a substantially nonaqueous system with provision for substantial removal of water formed by the reaction.

6. A process of forming a uniformly substituted nitrogen containing starchate which comprises the process of heating a tetra-substituted ammonium hydroxide with starch at a temperature of from 80° C. to 115° C. in a substantially non-aqueous system with provision for substantial removal of water formed by the reaction.

7. A new composition of matter consisting of uniformly substituted glucopyranose polymers substantially all units of which have a formula of $$HOCH_2\overbrace{CH(CH-)(CHOH)(HCONRR'R''R''')}^{O}CHO-$$

where R is a monovalent alkyl radical having not more than four carbon atoms, and where each R′, R″ and R‴ is a substituent selected from the group consisting of hydrogen and monovalent alkyl radicals having not more than four carbon atoms.

8. A new composition of matter formed by the reaction of glucopyranose polymers in a substantially nonaqueous system at a temperature of about 81° C. to about 115° C. with a substituted ammonium hydroxide and consisting of uniformly substituted glucopyranose polymers substantially all units of which have a structural formula of $$HOCH_2\overbrace{CH(CH-)(CHOH)(HCONRR'R''R''')}^{O}CHO-$$

where R is a monovalent alkyl radical having not more than four carbon atoms and where each R', R'' and R''' is a substituent selected from the group consisting of hydrogen and monovalent alkyl radicals having not more than four carbon atoms.

9. A starchate substantially each unit of which has the general structural formula of

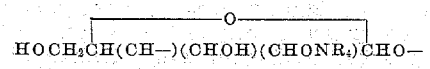

where each R may be any monovalent alkyl radical having not more than four carbon atoms.

10. A starchate substantially each unit of which has the general structural formula of

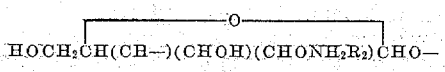

where R is a monovalent alkyl radical having not more than four carbon atoms.

11. A starchate substantially each unit of which has the general structural formula of

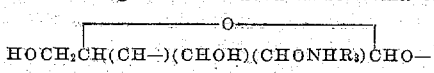

where each R is a monovalent alkyl radical having not more than four carbon atoms.

12. A starchate substantially each unit of which has the general structural formula of

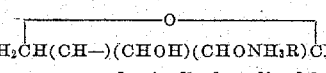

where R is a monovalent alkyl radical having not more than four carbon atoms.

KENNETH M. GAVER.
ESTHER P. LASURE
LEVI M. THOMAS.

REFERENCES CITED

The following references are of record in the file of this patent or the original patent:

UNITED STATES PATENTS

| Number | Name | Date |
|---|---|---|
| 1,986,881 | Dreyfus | Jan. 8, 1935 |
| 2,009,015 | Powers et al. | July 23, 1935 |